3,009,943
MANUFACTURE OF UNSATURATED NITRILE

David James Hadley, Epsom Downs, and Charles Albin Woodcock, Beckenham, England, assignors to The Distillers Company Limited, Edinburgh, Scotland, a British company
No Drawing. Filed Oct. 15, 1952, Ser. No. 314,952
Claims priority, application Great Britain Oct. 18, 1951
8 Claims. (Cl. 260—465.3)

The present invention relates to the manufacture of unsaturated organic nitriles, such as acrylonitrile and methacrylonitrile.

In our copending patent application U.S. Serial No. 262,646, filed December 20, 1951, now abandoned, there is described a process for the manufacture of unsaturated organic nitriles by the catalytical reaction of ammonia with unsaturated aldehydes in the gas phase at elevated temperatures in the presence in the reaction zone of molecular oxygen. As starting materials alpha-beta unsaturated aliphatic aldehydes may be used, such as acrolein, alpha-methacrolein, crotonaldehyde and alpha-ethyl-beta-propyl acrolein, whereby the corresponding unsaturated nitrile is produced, for instance acrylonitrile in the case of acrolein, and it is stated that an inert diluent for the reactants such as steam, nitrogen or carbon dioxide may be used.

It has now been found that the reaction is also satisfactorily carried out when the reactant mixture contains the olefines serving as starting materials for the production of said unsaturated aldehydes, for instance propylene and isobutene in the case of acrolein and methacrolein, and it is thus possible to use as the source of the unsaturated aldehydes the reaction mixture resulting from the catalytical oxidation in the gas phase of the corresponding olefines. These reaction mixtures contain, besides the desired unsaturated aldehyde, unreacted olefine used for the oxidation and various compounds which may be formed as byproducts during the reaction.

The principal object of the invention is to provide a simple and efficient process for the manufacture of unsaturated organic nitriles from olefines designated below.

The invention accordingly comprises the novel processes and steps of processes, specific embodiments of which are described hereinafter by way of example, and in accordance with which we now prefer to practice the invention.

Accordingly, the process for the production of unsaturated nitriles comprises oxidising a compound of the formula:

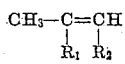

wherein $R_1$ and $R_2$ represent hydrogen or alkyl radicals over a catalyst at a temperature sufficient to form a gaseous mixture containing the corresponding alpha-beta unsaturated aldehyde, and treating said gaseous mixture with ammonia and molecular oxygen, in the presence of a second catalyst, at a temperature sufficient to form the corresponding nitrile from said aldehyde.

Olefines of the kind described are, for instance, propylene, isobutene, n-butene-2, 2-methylbutene-1, 2-methylbutene-2, n-pentene-2, 2-methylpentene-1, 2,4,4-trimethylbutene-1, 2,4,4-trimethylpentene-1, 2,4,4-trimethylpentene-2 and codimers of n-butene with isobutene.

The first stage of the above process comprising the catalytic partial oxidation of the olefines to the corresponding unsaturated aldehydes is already known. Methods which have been described include passing the olefine in admixture with molecular oxygen and in the presence in the reaction zone of elementary selenium over an oxidation catalyst at an elevated temperature. In another process the olefine is oxidised at elevated temperatures over a cuprous oxide catalyst distributed on a carrier, in the presence or absence of molecular oxygen, in the latter case the cuprous oxide becoming reduced, and having to be regenerated at periodic intervals. A modification of this process incorporates chlorine compounds, for example isopropyl chloride, in minute amounts in the reaction mixture. Cupric oxide on silica catalysts may also be used, the olefine being passed together with molecular oxygen over the catalyst at temperatures between, for instance, 250° to 350° C. A particularly satisfactory catalyst of this type is cupric oxide deposited on silica gel and heat treated at about 600° C. Metal tellurites and selenites can also be used as olefine oxidation catalysts.

It is surprising that the present process gives good yields of unsaturated nitrile based on the amount of olefine converted. Thus it is known from the prior art that propylene, for instance, when subjected alone to a reaction with molecular oxygen and ammonia at elevated temperatures, yield no, or at most insignificant amounts, of acrylonitrile, the main products being acetonitrile and hydrogen cyanide. Moreover, in carrying out the oxidation of the olefine to the corresponding unsaturated aldehyde the conversion of the olefine is practically never complete so that in the product there is invariably some unreacted olefine present. It is therefore surprising firstly that the unreacted olefine passes over the second reaction catalyst unchanged without reacting to produce contaminating byproducts, and secondly that the olefine does not interfere with the oxidation of the unsaturated aldehyde to the nitrile. In fact, the presence in the second reaction gas mixture of unreacted olefine from the first reaction appears to enhance, rather than to lower, the yield of nitrile. It is also surprising that other by-products of the first reaction do not interfere with the conversion of aldehyde to unsaturated nitrile. When, for instance, the catalytical oxidation of the olefine is effected in the presence of elementary selenium, selenium is present in the resulting reaction mixture either in the elementary form, or as an organic compound, and it is surprising that this admixture has no effect on the subsequent conversion of the aldehyde to the nitrile. Likewise byproducts such as formaldehyde, acrylic acid and acetic acid which are known to occur do not interfere in the second reaction.

In respect of the first stage of the present invention, it has been found that those processes for the conversion of olefines to unsaturated aldehydes in which elementary selenium is used are particularly satisfactory in the practice thereof. Such processes comprise passing the olefine in admixture with molecular oxygen and in the presence in the reaction zone of elementary selenium over a contact catalyst which may consist of or contain one or more of the metals and of the oxides of the metals, copper, vanadium, iron, cobalt, nickel, manganese, chromium, molybdenum, tungsten, uranium, tin, cerium and silver. Alternately, the catalyst may comprise the aluminate, silicate, molybdate, chromate, tungstate or vanadate of copper, singly or in mixtures. The reaction suitably takes place at temperatures in the range 200° to 400° C.

The presence of elementary selenium in the reaction zone may be attained in various ways known to the art, preferably by adding selenium in vapour form to the olefine-oxygen mixture before the latter is passed over the contact material. Satisfactory results are obtained with as much selenium as 2 milligrams per litre of the reaction gas mixture. Particularly good results are obtained, however, when the contact catalyst comprises initially copper-oxide distributed on activated alumina and which has been heat treated at temperatures in the range 800° to 1,000° C., by limiting the selenium to an amount in the range from 0.008 to 0.12 milligram per litre of the reaction gas mixture, and by effecting the reaction at temperatures in the range 210° to 350° C., and preferably in the range 230° to 300° C.

The catalysts employed in the first stage of the invention may be supported on carriers, for instance of siliceous or aluminous material. If desired the catalysts may be subjected to a preliminary heat treatment in the range 600° to 1,200° C., by which means the activity of the catalyst may be increased. It is also advantageous to employ in the first reaction chamber a catalyst comprising a zone of less active material followed by a zone of more active material. By this means efficient control over the rate and temperature of the reaction is achieved. While a large number of catalysts may be used in the first stage with good results, it has been found that particularly good yields of acrylonitrile are obtained from propylene by the use of a first stage catalyst comprising elementary selenium together with copper oxide distributed on activated alumina. Similarly, when methacrylonitrile is being prepared from isobutene a preferred catalyst comprises elementary selenium together with a solid contact material containing cupric silicate and silica and in which the molar ratio of copper to silica is between 1:2 and 1:12.

The gas mixture entering the first reactor may contain concentrations of olefine in the range 0.5 to 12% by volume, the higher content offering the advantage that higher concentrations of the unsaturated aldehyde are obtained for feeding into the second reactor. Likewise the concentration of oxygen in the first stage reactants may vary between fairly wide limits. Where selenium is employed as a first stage catalyst a lower limit of about 10% of oxygen is preferred when the olefine content is about 2%, and a lower limit of about 15% oxygen is preferred when the olefine content is about 10%. The remainder of the mixture may be made up with inert diluents such as nitrogen, steam and carbon dioxide. A satisfactory first reaction gas mixture consists of 2% by volume of olefine, and 98% by volume of air.

While both stages of the process are generally carried out at atmospheric pressure, super- or sub-atmospheric pressures may be used if desired. Likewise in both stages of the reaction contact times of the order of 0.1 to 20 seconds, preferably less than 10 seconds, are used with advantage.

Since the oxidation process for the conversion of the olefine into the unsaturated aldehyde is generally carried out at a lower temperature than the subsequent conversion into the nitrile, the gas mixture issuing from the first reactor does not require to be cooled down before it is conducted into the second reactor wherein the ultimate conversion into the nitrile takes place.

A great many catalysts may be used in the second stage of the invention. Useful catalysts may contain metal or metal oxides or compounds of, for instance, the following metals: copper, chromium, vanadium, manganese, iron, cobalt, nickel, molybdenum, silver, zinc, cadmium, tin, tungsten, rhenium, lead, platinum, gold, aluminium, palladium, rhodium, bismuth and uranium, and these metals or metal compounds may be used singly or in mixture. If desired, the catalyst may be deposited on a carrier, for instance of siliceous or aluminous material. As in the first reaction the efficiency of the catalyst may be increased by heat treatment. Thus, in the case of alumina-supported catalysts, the catalyst is improved by heating the carrier at, say 1,000° C., before or after addition of the catalytic agent. It has been found that a particularly suitable catalyst for the second stage of the reaction comprises molybdenum oxide either unsupported, or deposited on kieselguhr or on silica gel, and in the latter case the activity of the catalyst may be further enhanced by treatment with phosphoric acid. Thus a suitable composition contains about 80 parts by weight of silica gel to 20 parts by weight of molybdenum oxide, and in addition one mole of phosphoric acid to each 12 moles of molybdenum oxide.

The second reaction may take place at temperatures in the range 250° to 600° C., and preferably between 350° and 450° C.

The concentration of oxygen in the second stage may vary within wide limits. Generally, it is preferred to use a gas mixture for the second stage containing between 3 and 20% of oxygen and at least one half of a molecule of oxygen per mole of the unsaturated aldehyde issuing from the first reactor. If the reaction mixture issuing from the first reactor contains less oxygen than this, additional oxygen may be added with the ammonia to bring the concentration within the desired limits.

The second reaction takes place satisfactorily when the concentration of unsaturated aldehyde is below 10% and preferably below 3%, though if desired the concentration may be as high as 50%. If it is desired to raise the concentration of aldehyde in the gas mixture issuing from the first reactor part of the gas mixture may be recycled to the entrance of the first reactor, by which method a mixture relatively rich in unsaturated aldehyde may be available for the second reaction. Alternatively, pure or crude aldehyde may be added with the ammonia to the gas mixture before the second stage. If desired, the gases may be recycled from the second reactor to the first reactor, after suitable separation therefrom of the organic nitrile produced and any excess of ammonia and other bases.

The concentration of ammonia in the gas mixture entering the second stage may also vary. In general a ratio of more than one mole of ammonia to one mole of the unsaturated aldehyde may be used with advantage, for instance up to 1.5 to 1 when the starting material is propylene.

The reaction mixture leaving the second reactor may be worked up by methods known in the art, as for instance extraction of the unsaturated nitrile into a solvent, such as water, and fractional distillation therefrom. Where the first stage reaction takes place in the presence of elementary selenium, selenium is present in the resulting gas mixture either in the elementary form or as an organic compound. While this may be removed before the second stage, if desired, it is preferred to extract the selenium from the gas mixture issuing from the second reactor prior to the extraction of the nitrile. This may be effected by cooling the issuing gases to a temperature which is not lower than the dew-point of the constituents of the mixture other than selenium, when the selenium is deposited as a solid. Alternatively, the selenium may be adsorbed onto an adsorbing agent, such as charcoal. Also prior to the extraction of the nitrile from the second stage products ammonia and other bases present are preferably neutralised for example by quenching the gases in aqueous acid solution.

The new combined process offers a number of advantages. Thus the isolation of the unsaturated aldehyde from the reaction mixture resulting from the partial oxidation of the olefine becomes unnecessary. Likewise the provision of apparatus and heat for the re-vaporisation of the aldehyde is also unnecessary. Since the unsaturated aldehydes suffer from a pronounced tendency to polymerise in the condensed state the use of the vapour directly for the nitrile production avoids operational difficulties. As was noted above, the presence of unreacted olefine in the second reaction gas mixture, rather than interfering with the reaction, appears to have a catalytic effect on the process, thereby giving enhanced yields of unsaturated nitrile. A further advantage of the combined process is provided by the fact that the heat of reaction of the second stage, which generally takes place at a higher temperature than does the first stage, may be used to pre-heat the reactants for the first stage.

The following examples illustrate the manner in which the process of the invention may be carried out in practice:

Example 1

A mixture of 2% by volume propylene and 98% by volume of air was passed at the rate of 25 litres per hour over molten selenium so that each litre of gas acquired 0.8 milligram of selenium. The gas then entered a reactor made of 6 mm. bore Pyrex (Registered Trade Mark) glass tubing, containing 16 grams of catalyst prepared by impregnating activated alumina granules with a solution of 5 parts of copper nitrate in 2 parts of water, draining off excess liquid and heating the granules to 850° C. for 1½ hours. The reactor was maintained at 320° C. The exit gas containing approximately 18% by volume of oxygen was mixed with 0.5 litre per hour of ammonia gas and then passed without cooling into a second reactor containing 8 grams of a catalyst consisting of 23% by weight of phosphomoylbdic acid on silica gel. The second reactor was maintained at 400° C. The pressure in both reactors was atmospheric. The exit gas passed through a short length of glass tubing, whereby it was cooled to about 150° C. and most of the selenium was deposited, and then washed with a small quantity of N/10 sulphuric acid which removed basic compounds. Afterwards the gas was washed with water in countercurrent. The acrylonitrile was recovered from the combined sulphuric acid and water washings in a 48% yield based on the propylene fed into the system.

Example 2

The procedure described in Example 1 was repeated with the first reactor maintained at 280° C. and the concentration of selenium in the gas entering the first reactor adjusted to 0.08 milligrams per litre. Of the propylene fed to the system 31% was converted to acrylonitrile and 49% remained unchanged.

Example 3

*Part 1.*—A mixture of 1.7% by volume of propylene and 98.3% by volume of air was passed, at the rate of 600 litres per hour (referred to room temperature) over molten selenium, from which each litre of gas acquired 0.2 mg. of selenium. The gas then passed downwards through a vertical reactor made of 1½ inch diameter stainless steel tube, which was heated in a liquid bath maintained at 280° C. The upper section of the reactor served as a preheater for the gas; the lower section contained 920 gms. of a mixture of equal parts by weight of a catalyst prepared as described in Example 1 and a catalyst which was similarly prepared except that the heat treatment of 1½ hours was at 1,000° C. instead of at 850° C. The exit gas passed through an air-cooled cylindrical steel tube 5″ in diameter and 12″ long, from which it emerged at approximately room temperature, and in which most of the selenium was deposited, and was then countercurrently scrubbed with water. Acrolein was distilled from the water solution.

74% of the propylene which entered the reactor was converted to acrolein and 12% to $CO_2$.

*Part 2.*—A stream of nitrogen passed through a reservoir of liquid acrolein and was joined by a stream of air. The mixture was heated to approximately 250° C. and was joined by a stream of ammonia. The mixture thereby obtained, which flowed at 600 litres per hour (referred to room temperature and pressure) and which contained by volume 1.3% acrolein, 1.5% ammonia and 20% oxygen, was passed successively through a preheater and 1½ inch diameter stainless steel tubular reactor, both of which were heated by a liquid bath maintained at 370° C. The reactor contained 260 gms. of pellets of 3/16 inch diameter which consisted of 23% phosphomolybdic acid deposited on silica gel. The gas leaving the reactor was cooled to about 100° C., washed with a small quantity of recycled, dilute sulphuric acid in co-current and finally with water in countercurrent. Acrylonitrile was distilled from the aqueous solutions. 65% of the acrolein fed to the reactor was converted to acrylonitrile and 6% to $CO_2$. Combining the yields of Parts 1 and 2, the overall yield of acrylonitrile from propylene was 48%.

*Part 3.*—The selenium trap was disconnected from the reactor described in Part 1, and the exit of this reactor was connected by a heated tube to the inlet of the reactor described in Part 2. The feed of the first reactor and the conditions for the oxidation of propylene were as already given, but the acrolein produced was not isolated; instead, the gas from the first reactor was, without cooling, mixed with 1.5% by volume of ammonia and passed into the second reactor which contained the identical catalyst mentioned in Part 2 at the same bath temperature of 370° C. The exit gas from the second reactor passed through a horizontal steel tube 9 inches in length and 1.5 inches in diameter where it was cooled below 100° C. and most of the selenium was deposited. Recovery of acrylonitrile from the issuing gas by washing with dilute acid and water was carried out as in Part 2.

58% of the propylene entering the system was converted to acrylonitrile and 15% to $CO_2$. The amount of propylene entering the second reactor was substantially the same as that leaving it.

Example 4

A catalyst for the oxidation of isobutene was prepared in the following manner:

200 gms. commercial sodium metasilicate, containing about 50% by weight of $Na_2SiO_3$, was dissolved in 2 litres of cold water. Dilute hydrochloric acid (1 volume concentrated acid to 4 volumes water) was added until the mixture was acid to methyl red. A gel rapidly formed. In another vessel a solution of 25 gm. copper nitrate in 250 ml. water was mixed with a solution of 25 gm. sodium metasilicate in 1 litre of water. The suspension of copper silicate thus obtained was mixed with the silica gel and the whole was vigorously stirred. The mixed precipitate was then filtered off under suction, and as much liquid as possible was removed, but the filter cake was not washed. It was dried at 100° C., heated for 1½ hours at 320° C., ground to pass an 18 mesh British Standard Testing sieve and formed into ⅛ inch diameter pellets which were heated at 600° C. for 1½ hours.

16 gms. of catalyst so obtained was placed in a reactor made of 6 in. bore Pyrex glass (Registered Trade Mark) tubing, which was heated in a liquid bath at 320° C., and through it was passed 25 litres per hour (room temperature and pressure) of a mixture of 2 volumes isobutene and 98 volumes air, which had previously been passed over molten selenium so that each litre gas acquired 0.6 milligram of selenium. The gas leaving this reactor was mixed with 0.6 litre per hour of ammonia gas and passed without cooling, into a second reactor containing 16 gms. of a catalyst made by compressing ammonium molybdate into ⅛ inch diameter pellets. The second reactor was maintained at 380° C. The exit gas was passed through a short length of glass tubing, in which it was cooled to about 100° C. and deposited selenium, and was then washed with a small quantity of N/10 sulphuric acid, and subsequently with water in countercurrent.

Alpha-methylacrylonitrile was recovered from the combined sulphuric acid and water washings in 20% yield based on the isobutene fed to the system.

We claim:

1. A process for the production of an unsaturated nitrile which comprises subjecting oxygen and an olefine from the group consisting of propylene and isobutylene to vapor-phase catalytic oxidation with production of a mixture of alpha, beta-olefinic aldehyde and other oxidation products, adding ammonia to the mixture while gaseous, and subjecting the resulting gaseous mixture to catalytic reaction at about 300 to 550° C. in the presence of oxygen and a metal oxide oxidation catalyst to form the unsaturated nitrile.

2. A process which comprises mixing in the vapor phase an unsaturated olefine with molecular oxygen, said olefine having the formula

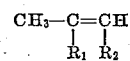

wherein $R_1$ and $R_2$ are selected from the group consisting of hydrogen and alkyl radicals, and heating the mixture in the vapor phase in the presence of selenium and another catalyst at about 200°–400° C. to produce the corresponding impure alpha-beta unsaturated aldehyde in a first reaction zone, said catalyst comprising at least one compound selected from the group consisting of the aluminate, silicate, molybdate and tungstate of copper and the metals, and oxides of the metals, copper, iron, cobalt, nickel, manganese, chromium, vanadium, tungsten, uranium, tin, cerium, and silver, and subjecting the impure aldehyde containing unreacted olefine to ammonia and molecular oxygen in the presence of a second catalyst selected from the group consisting of the metals and inorganic compounds of the metals, copper, chromium, vanadium, manganese, iron, cobalt, nickel, molybdenum, silver, zinc, cadmium, tin, tungsten, rhenium, lead, platinum, gold, aluminum, palladium, rhodium, bismuth, and uranium in a second zone to form the corresponding nitrile from said aldehyde at about 250°–600° C.

3. A process according to claim 2, wherein the selenium is present in vapour form in an amount of from 0.008 to 0.12 milligram per litre of the first reaction gas mixture, wherein the first reaction catalyst is selenium together with a copper-containing compound, which compound is preheated to temperature between 800° and 1,000° C. and wherein the first reaction takes place at temperatures between 230° and 300° C.

4. A process according to claim 2 in which the starting material is propylene and the catalyst for the first reaction comprises elementary selenium together with copper oxide distributed on activated alumina.

5. A process according to claim 2 in which the starting material is isobutene and the catalyst for the first reaction comprises elementary selenium together with a solid contact material containing cupric silicate and silica, in which the molar ratio of copper to silica is between 1:2 and 1:12.

6. A process according to claim 2, wherein the second reaction catalyst comprises molybdenum oxide which has been treated with phosphoric acid, and deposited on a carrier of siliceous material.

7. A process for the production of unsaturated nitriles which comprises oxidising propylene in the vapor phase at temperatures in the range 300 to 350° C. in the presence in the reaction zone of elementary selenium over a catalyst comprising initially copper oxide deposited on activated alumina to form a gaseous mixture containing acrolein, and treating said gaseous mixture with ammonia and molecular oxygen at temperatures in the range 350 to 450° C. over a catalyst comprising molybdenum oxide which has been treated with phosphoric acid and deposited on a siliceous carrier.

8. A process for the production of unsaturated nitriles which comprises oxidising isobutene in the vapor phase at temperatures in the range 300° to 350° C. in the presence in the reaction zone of elementary selenium, over a catalyst containing cupric silicate and silica, in which the molar ratio of copper to silica is between 1:2 and 1:12, to form a gaseous mixture containing methacrolein, and treating said gaseous mixture with ammonia and molecular oxygen at temperatures in the range 350° to 450° C. over a catalyst comprising molybdenum oxide which has been treated with phosphoric acid and deposited on a siliceous carrier.

References Cited in the file of this patent

UNITED STATES PATENTS

| | | |
|---|---|---|
| 2,443,420 | Gresham | June 15, 1948 |
| 2,451,485 | Hearne et al. | Oct. 19, 1948 |
| 2,452,187 | Gresham | Oct. 26, 1948 |
| 2,481,826 | Cosby | Sept. 13, 1949 |
| 2,525,818 | Mahan | Oct. 17, 1950 |
| 2,554,484 | Loder | Mar. 29, 1951 |
| 2,593,437 | Goodings et al. | Apr. 22, 1952 |
| 2,691,037 | Bellringer et al. | Oct. 5, 1954 |

FOREIGN PATENTS

| | | |
|---|---|---|
| 625,330 | Great Britain | June 27, 1949 |

OTHER REFERENCES

Mowry: Chem. Reviews, vol. 42, p. 249–250 (1948).